Aug. 23, 1932.   F. F. FORSHEE   1,873,374
TEMPERATURE INDICATOR
Filed Aug. 6, 1929
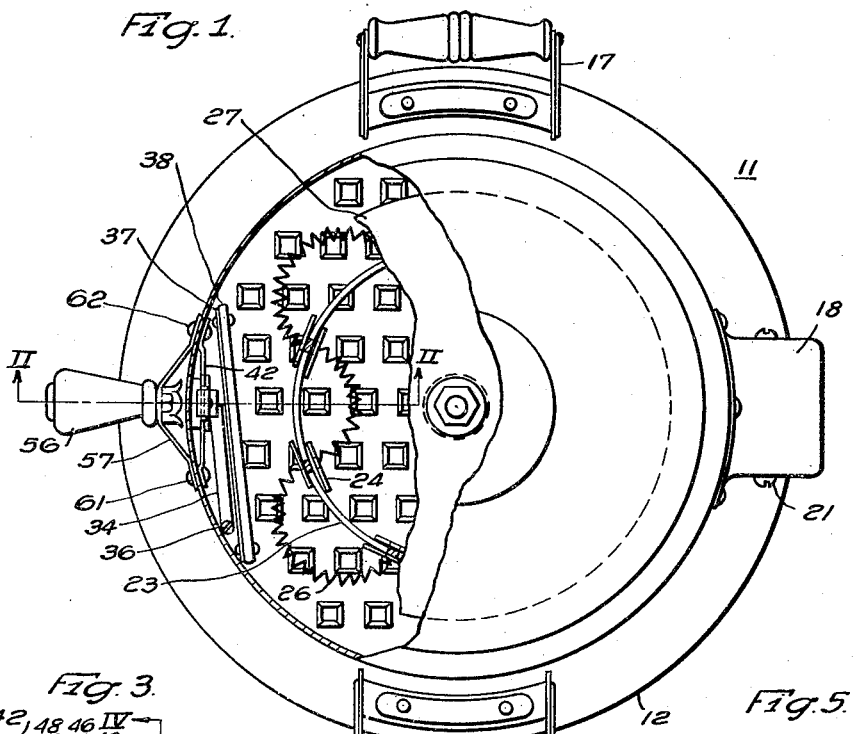
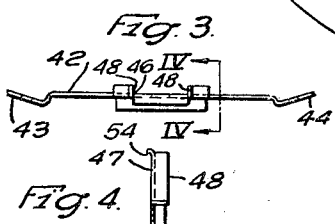
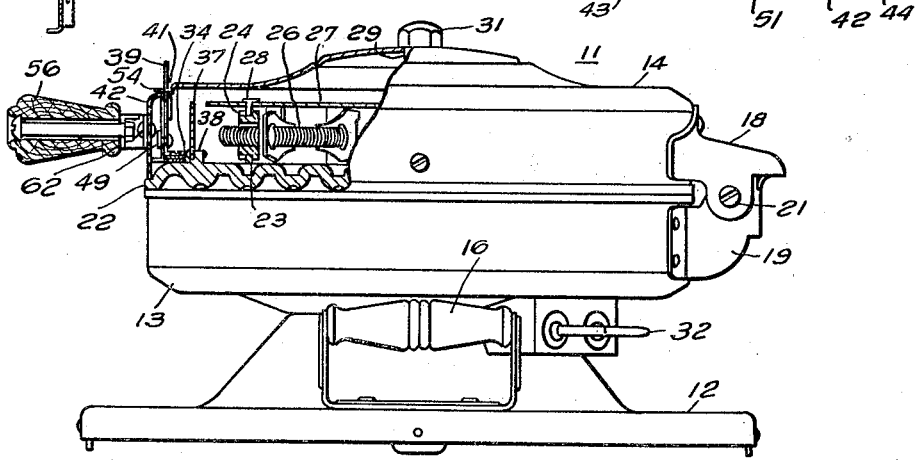
INVENTOR
Frank F. Forshee.
BY
Wesley J. Carr
ATTORNEY Patented Aug. 23, 1932

1,873,374

UNITED STATES PATENT OFFICE

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA

TEMPERATURE INDICATOR

Application filed August 6, 1929. Serial No. 383,824.

My invention relates to electric cooking devices and more particularly to temperature indicators therefor.

An object of my invention is to provide a relatively simple and easily manufactured and assembled and highly efficient temperature indicating device cooperating with the baking surface of an electric cooking appliance, such as a waffle iron.

In practicing my invention, I provide a temperature indicating device operatively associated with the baking surface of a waffle iron having radiant heating elements secured to the rear face of the respective baking surfaces, the temperature indicating means comprising a thermally actuable element for moving an indicator, which indicator extends through a housing covering, the heating element on one of the baking surfaces, in combination with a barrier for preventing the direct action of the radiant heating element on the thermally actuable member. A guide bracket having a guide slot therein extending laterally thereof is provided for movably supporting the indicator, common means being employed for securing the guide bracket and a handle bracket to the cover member on opposite sides thereof.

In the single sheet of drawing:

Figure 1 is a top plan view of a waffle iron embodying my invention, a portion of the cover being broken away to show the temperature indicator;

Fig. 2 is a view in side elevation of the device shown in Fig. 1, parts thereof being shown in section taken on the line II—II of Fig. 1;

Fig. 3 is a top plan view of a guide bracket;

Fig. 4 is a view in lateral section therethrough taken on the line IV—IV of Fig. 3; and Fig. 5 is a view in front elevation of the temperature indicator and guide bracket disassembled from the waffle iron.

A waffle iron designated by the numeral 11 comprises a base member 12, a lower casing 13 and an upper casing 14. The base member 12 is provided with handle members 16 and 17. The upper and lower casings are hingedly connected by means including the upper bracket 18 and the lower bracket 19 secured respectively to the upper and lower casing or cover members 14 and 13 and the usual hinge pin 21.

Each casing or cover member has operatively associated, therewith at its open end, baking surface 22 having the usual corrugated face provided in waffle baking devices.

A radiant heating element is operatively associated with each of the baking surfaces and as shown in Figs. 1 and 2 it comprises an annular strip 23 of sheet metal provided with a plurality of laterally extending recesses therein for receiving refractory thimbles 24 having openings therethrough, through which there extends a helically wound resistor member 26, located on alternate sides of the strip 23 in substantially the manner shown in Fig. 1 of the drawing. A reflector plate 27 of sheet metal is provided and has recesses therein through which lugs 28 integral with the strip 23 may extend and be bent over in order to hold the strip 23 in its preformed substantially annular shape. A stud 29 is provided for clamping the heating element hereinbefore described against the rear face of the baking surface 22 and for clamping the baking surface in the open end of the dished cover 14. An ornamental nut 31 may be provided on the stud 29 to hold these parts in proper operative positions relatively to each other.

Substantially the same construction is employed in the lower casing 13 and it is to be understood that I have illustrated and described these parts more particularly only for the reason that the device embodying my invention and now to be described has been developed in connection with an electric cooking device and more particularly an electrically heated waffle iron embodying the structural elements which have just been described.

A plurality of terminal pins 32 are insulatedly mounted on the base member 12 and the heating elements 26 are electrically connected to each other and to the terminal pins 32 in a manner well known in the art and as the details of construction of these elements constitute no part of my invention, I have not deemed it necessary to illustrate or describe them in greater detail.

It has been found highly desirable to provide on a device of this kind a temperature indicating means which will give an operator some idea of the temperature of the baking surface. It is, of course, necessary in starting the waffle iron that the baking surfaces be permitted to be heated by the radiant heating elements to a predetermined temperature or at least to a temperature above a minimum baking temperature. It is possible to bake satisfactory waffles at a relatively low operating temperature if the waffles are baked for a relatively long time, and it is also possible to bake waffles satisfactorily at a higher temperature and for a shorter length of time. It is highly desirable, therefore, that a device of this kind be provided with a relatively simple temperature indicator which may easily be read by an operator.

A thermally actuable element subjected more particularly to the temperature of the baking surface is indicated by the numeral 34 in Figs. 1 and 2 and as there shown comprises a normally or initially straight bimetallic strip secured at one end thereof by a small machine screw 36 to the rear surface of the member 22. In order that the member 34 may respond to the temperature of the baking surface 22 and not to the temperature of the radiant heater, I provide a barrier in the shape of a metal strip 37 which is sufficiently long to screen the member 34 from the heat radiated by the resistor 26 and which extends at right angles to the face of the member 22. The member 37 is secured against a boss 38 integral with the rear surface of the member 22.

An indicator 39 is provided which extends through an opening 41 in what may be called the front portion of the cover or casing 14. The wall of the casing at the rear of the opening 41 is curved downwardly as is shown more particularly in Fig. 2 in order to provide a smooth surface past which the indicator 39 may move upwardly and downwardly.

A guide bracket 42 is of substantially the shape shown in Figs. 3, 4 and 5 of the drawing and includes perforated end portions 43 and 44 and a laterally extending guide slot 46 as well as a lateral integral extension 47, the edge portions 48 of which are bent at right angles to the general plane of the member 42 in order to provide a relatively short member of channel shape in lateral section within which the indicator 39 may move.

The indicator 39 is provided with a lateral extension at its lower end shown more particularly in Fig. 2 of the drawing so that the member 34 may engage and lift the indicator in response to bending action as its temperature is increased in accordance with that of the baking surface 22. A guide pin 49 is secured to the indicator 39, the body portion being located in the slot 46 and a head being formed thereon on the outside of the guide member 42, this head being indicated by the numeral 51 in Fig. 5 of the drawing.

The forward surface of the indicator 39 may be provided with some suitable mark cooperating with some fixed portion of the cooking device and I have indicated a roughened portion 52 together with arrows 53 above and below the roughened portion.

The guide bracket 42 has a part 54 thereof extending through the opening 41 and bent over the front part of the edge of the casing 14 adjacent to the opening 41 in order to provide a finished appearance.

A handle 56 is directly secured to a handle bracket 57 which is of substantially V-shape. The handle bracket 57 is of such dimensions that the openings in the end portions thereof will be alined with the openings in the end portions 43 and 44 of the guide bracket. Rivets 61 and 62 may, therefore, extend through the perforated ends of the guide bracket 42 located on the inside of the casing 14 and through the perforated ends of the handle bracket 57 located on the outside of the casing 14 as well as through the casing 14 and hold all of these members in their proper operative positions.

Extended tests have shown that a temperature indicating device as illustrated in the drawing will respond not to the temperature of the heating unit, but of the baking surface and the vertical movements of the indicator member 39 can be easily seen by an operator during the operation of baking and it has been found that a device of this kind will indicate not only the initial temperature and that the waffle iron is ready for operation, but also will indicate continuously the temperature thereof so that waffles baked to the proper consistency can easily and continuously be made as long as the waffle iron is suitably energized.

Various modifications may be made in the device embodying my invention without departing from the spirit and scope thereof and I desire, therefore, that only such limitations shall be placed thereon as are imposed by the prior art or are set forth in the appended claims.

I claim as my invention:

1. A temperature-indicating means for a cooking appliance having a heated cooking surface and an apertured cover member therefor, said temperature-indicating means including a guide bracket on the inside of the cover member having a guide slot therein, an indicator freely movable through the aperture in the cover member, a guide pin on the indicator movable in the guide slot, and a bimetal member having a portion for moving the indicator relatively to the cover in accordance with temperature changes of cooking surface.

2. A temperature-indicating means for a waffle iron having a heated cooking surface and a dished cover member for the cooking surface, having an opening therein, said temperature-indicating means including a bimetal strip actuated by the temperature of the cooking surface, an indicator freely movable through the opening in the cover member and normally operatively engaging the bimetal strip to be moved thereby, a guide bracket on the inside of the cover member having a guide slot therein extending axially relatively to the dished cover member and having laterally-bent edge portions parallel to the guide slot, and a guide pin secured to the indicator extending through and movable in the guide slot, for cooperating with the laterally-bent edge portions on the bracket to hold the indicator in proper operative position relatively to the guide bracket and to guide the same relatively thereto.

3. A temperature indicator assembly for an electrically heated device having a casing, a cooking surface in the casing, an open radiant heating element within the casing and a straight barrier on the inner face of the cooking surface, said indicator including a straight bimetal bar located on that side of the barrier away from the heating element and having one end portion secured to the cooking surface and an indicator member engaged by the other end portion of the bimetal bar to be moved thereby and guiding means for the indicator located wholly within the casing.

4. A temperature indicator assembly for a heated device having a casing and a cooking surface in the casing, said indicator including a thermally-actuable element, an indicator member movable outwardly through the casing by the thermally-actuable element and guiding means for the indicator member located wholly within the casing.

5. A temperature indicator assembly for a heated device having a casing, a cooking surface in the casing, an open radiant heating element within the casing and located substantially centrally of the cooking surface and a straight barrier member on the covered face of the cooking surface and near an edge of the cooking surface, said indicator assembly including a bimetal bar having an end portion secured to the cooking surface adjacent to the barrier and on that side thereof away from the heating element, a slotted guide member supported by the casing therewithin and an indicator member having interlocking engagement with the guide member movable outwardly through the casing by the other end of the bimetal bar.

In testimony whereof, I have hereunto subscribed my name this 9th day of July, 1929.

FRANK F. FORSHEE.